July 23, 1929.  H. V. REED  1,721,504

DRIVEN PLATE FOR FRICTION CLUTCHES

Filed May 4, 1927

Inventor
Harold V. Reed
By Wm. O. Bell Atty.

Patented July 23, 1929.

1,721,504

UNITED STATES PATENT OFFICE.

HAROLD V. REED, OF CHICAGO, ILLINOIS, ASSIGNOR TO THE BORG & BECK COMPANY, OF CHICAGO, ILLINOIS, A CORPORATION OF ILLINOIS.

DRIVEN PLATE FOR FRICTION CLUTCHES.

Application filed May 4, 1927. Serial No. 188,729.

The object of this invention is to provide a double disk driven plate of novel construction for friction clutches which will absorb the noises due to periodic vibrations of the engine and prevent them from being carried forward to the transmission where they would become audible and objectionable.

Another object of the invention is to provide a double disk driven plate of novel construction which is capable of torsional flexibility within itself to absorb vibrations and other noises emanating from the engine with which the clutch embodying the driven plate is mechanically connected.

A further object of the invention is to provide a driven plate having a hub member and a double disk friction member with a yielding cushion therebetween to absorb vibrations, to reduce spinning movement, and to facilitate gear shifting.

And a further object is to provide a double disk driven plate of simple, light and substantial construction which will give long and efficient service.

In the accompanying drawings illustrating a selected embodiment of the invention:

Figure 1:
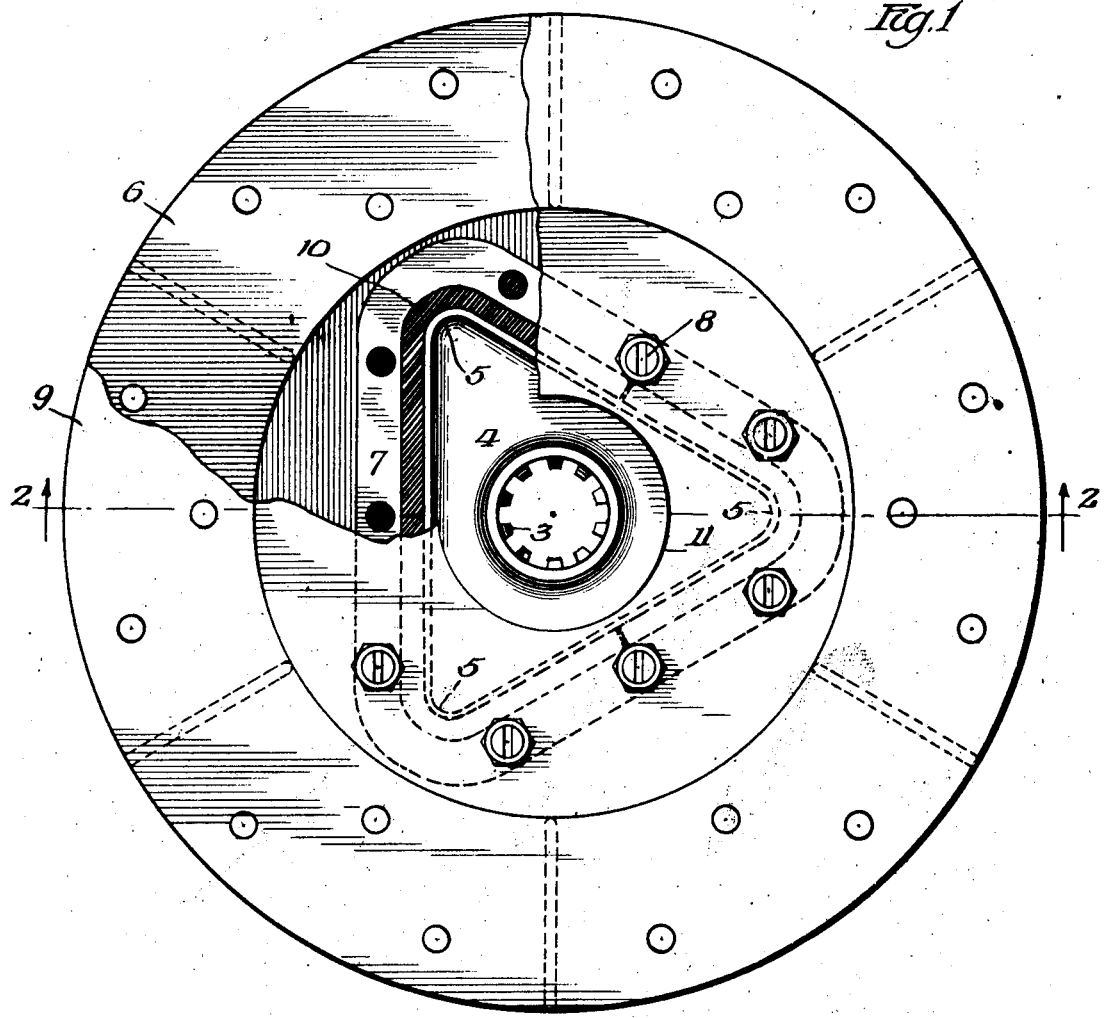
Fig. 1 is an elevation of the driven plate, partly broken away and partly in section.
Figure 2:
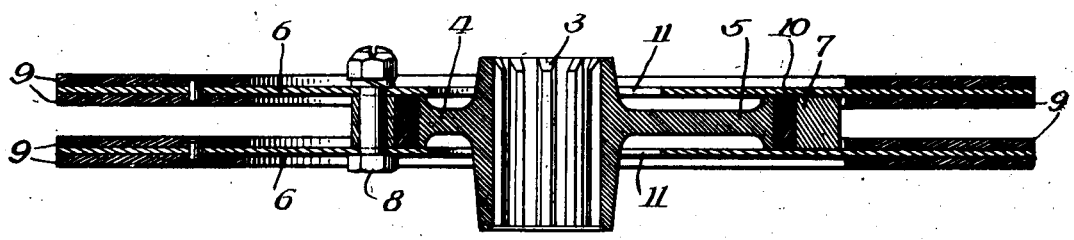
Fig. 2 is a transverse sectional view on the line 2—2 of Fig. 1.

Referring to the drawings the driven plate comprises a double disk friction member which is mounted upon a centrally disposed hub member and a compressible cushion interposed between said members so that movement of the friction member is communicated through the cushion, and by compression only of the cushion, to the hub member.

The hub member comprises a hub 3 having an integral flange 4 which is triangular in shape and has three angles 5 symmetrically disposed about the hub. The friction member comprises two disks in the form of flat plate rings which are secured together in spaced relation upon opposite sides of a triangular shaped skeleton spacer 7 by bolts 8 which pass through the disks and the spacer. Friction rings 9 are fastened to both sides of the disks at and adjacent to the periphery thereof. The triangular spacer is spaced from the triangular flange of the hub member to form therebetween and between the disks a cushion chamber to receive the cushion 10. This cushion may be in the form of a single strip with its ends abutting, but I prefer to make it in three sections each of which extends about one of the angular projections 5 of the triangular flange 4 and with the ends of the several sections at or about abutting. Thus the cushion is of substantially triangular shape and is confined in a substantially triangular chamber formed between the hub flange, the spacer and the two disks, so that it is free to work in the chamber, but is prevented from bulging or otherwise escaping from the chamber. The disks overlie the outer edge of the flange of the hub member sufficiently to form a closed chamber under all conditions and the disks are provided with enlarged openings 11 to receive the hub whereby the hub member and the flange member may have a certain degree of free relative movement, due to the compression of the cushion.

My invention provides a flexible cushion between the double disk friction driving member and the hub driven member of the driven plate through which cushion movement of the driving member is communicated to the driven member. The parts are simple in construction, they can be readily assembled, the cushion is confined in a triangular chamber formed between the triangular flange on the hub member, the disks of the friction member and the hollow triangular spacer which is secured between and to the disks, and the construction is such that the material of the cushion is permitted to flow lengthwise of the cushion under compression, and tension of the cushion is avoided. The cushion will absorb the noises which emanate from the engine and which would otherwise travel to the transmission and it also facilitates gear shifting and reduces the noises incident thereto.

I claim:

1. A driven plate for friction clutches comprising a hub member, a friction member comprising a pair of disks, and a compressible cushion interposed between said members and between said disks.

2. A driven plate for friction clutches comprising a hub member, a friction member having two disks overlapping the hub member, a spacer interposed between said disks and secured thereto to hold the disks together in spaced relation and upon the hub member, and a cushion interposed between the hub member and the spacer.

3. A driven plate for friction clutches comprising a hub member having a hub and a plurality of projections extending therefrom, a friction member comprising two disks, a spacer interposed between and secured to said disks, said spacer being shaped to form an angular chamber between itself and the hub member and the disks, and a cushion in said chamber.

4. A driven plate for friction clutches comprising a hub member, a double disk friction member, said members having oppositely disposed triangular shaped parts forming a triangular chamber between said parts and the disks, and a cushion in said chamber.

5. A driven plate for friction clutches comprising a trangular shaped member having a centrally disposed hub therein, a double disk friction member comprising two disks, a hollow triangular spacer arranged between said disks, means securing the disks upon the spacer, there being a triangular shaped chamber between the hub member the spacer and the disks, and a cushion arranged in said chamber.

HAROLD V. REED.